United States Patent [19]
Atkinson

[11] 3,834,664
[45] Sept. 10, 1974

[54] BALL VALVE STRUCTURE HAVING PRESSURE ACTUATED SEATS

[75] Inventor: Eulas R. Atkinson, Conroe, Tex.

[73] Assignee: ACF Industries, Incorporated, New York, N.Y.

[22] Filed: Mar. 5, 1973

[21] Appl. No.: 337,785

[52] U.S. Cl............... 251/174, 251/172, 251/315, 251/328
[51] Int. Cl............................................. F16k 5/06
[58] Field of Search .......... 251/170, 171, 172, 174, 251/315, 328

[56] References Cited
UNITED STATES PATENTS

| | | | |
|---|---|---|---|
| 2,628,060 | 2/1953 | Parker | 251/174 |
| 2,834,613 | 5/1958 | Snyder | 251/174 X |
| 2,868,498 | 1/1959 | Kaiser | 251/172 |
| 2,916,254 | 12/1959 | Wendell | 251/172 |
| 3,122,352 | 2/1964 | Anderson | 251/174 X |
| 3,379,410 | 4/1968 | Stewart | 251/174 X |
| 3,575,198 | 4/1971 | Ellis | 251/172 X |

FOREIGN PATENTS OR APPLICATIONS

| | | | |
|---|---|---|---|
| 559,270 | 6/1958 | Canada | 251/174 |

*Primary Examiner*—Harold W. Weakley
*Attorney, Agent, or Firm*—Eugene N. Riddle

[57] ABSTRACT

A double-acting valve seat assembly for a valve structure having a valve body chamber and a movable valve member in the valve body chamber. A greater area at the rear portion of the upstream seat assembly is exposed when upstream or flowline fluid pressure is greater than body fluid pressure. A separate annular member is mounted in the seat recess adjacent the valve body and is spaced from the adjacent seat assembly to form an annular back seal chamber having a width extending in a generally transversely direction with respect to the longitudinal axis of the valve. An annular seal is positioned in the back seal chamber for movement between inner and outer end portions of the back seal chamber and permits leakage behind the annular member from the valve body when positioned between innermost and outermost positions thereby to relieve excessive fluid pressures in the valve body.

8 Claims, 5 Drawing Figures

PATENTED SEP 10 1974    3,834,664
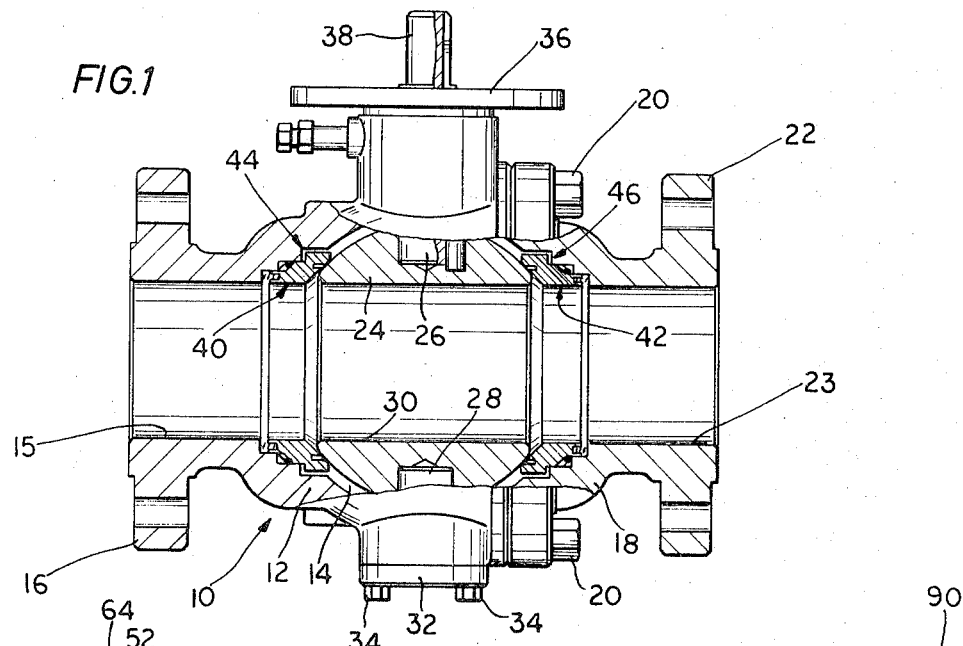
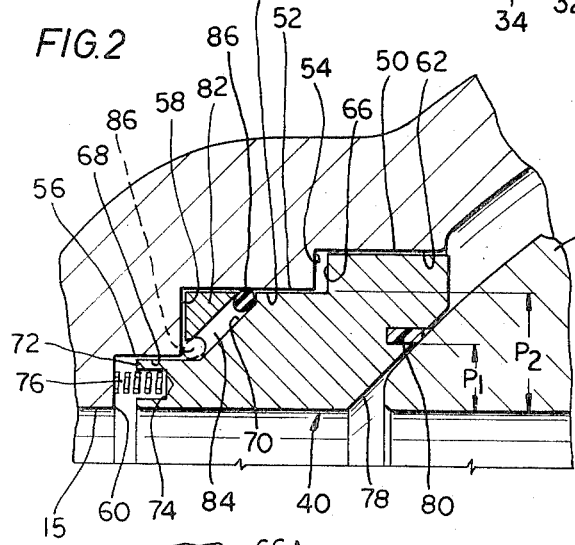
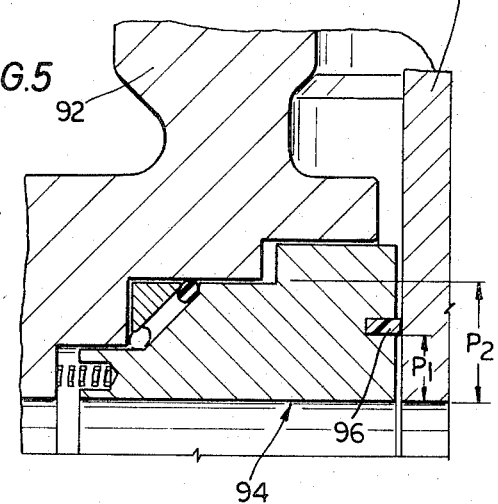
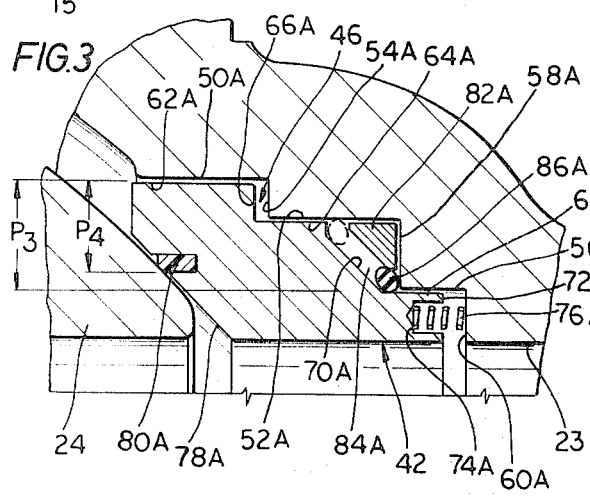
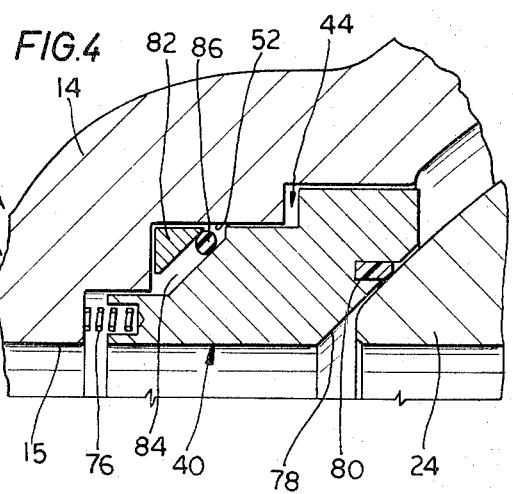

3,834,664

BALL VALVE STRUCTURE HAVING PRESSURE ACTUATED SEATS

BACKGROUND OF THE INVENTION

Valves having so-called double-acting seats which are responsive to both downstream and upstream fluid pressure have been employed heretofore. Normally when such double-acting seats are exposed to upstream fluid pressure greater than body pressure a greater area at the rear portion of the seat assembly is exposed to fluid pressure than at the face or front portion thereof so that the seat assembly is pressure actuated toward the valve member. Likewise, when body fluid pressure is greater than upstream or flowline fluid pressure, the seat assemblies are exposed to body fluid pressure over a larger area at the rear portions thereof than at the faces so that the seat assemblies are pressure actuated toward the valve member.

Usually, the above has been accomplished by employing a pair of back face seals spaced radially from each other and movable between two positions to provide a greater rear area exposed to fluid pressure when either upstream fluid pressure is greater than body fluid pressure or when body fluid pressure is greater than flowline fluid pressure. For example, prior U.S. Pat. No. 3,421,733 discloses a valve having a double-acting seat system in which a pair of radially spaced back face seals are employed, one on either side of the face sealing perimeter. Upstream fluid pressure acts upon an area at the rear of the upstream seat assembly which is greater than the area at the front or face portion of the seat assembly which is defined by the face sealing perimeter.

Heretofore, valves having double-acting seat systems have been provided with separate body relief valves for the valve body for preventing excessive pressures within the valve body which might, for example, result from thermal expansion of trapped body fluid.

DESCRIPTION OF THE PRESENT INVENTION

The present invention is directed to a valve structure having a valve chamber and a valve member mounted within the valve chamber being movable between open and closed positions. Upstream and downstream seat assemblies are movably mounted within seat recesses adjacent opposite sides of the valve member and each seat assembly has a circumferential face seal in sealing contact with the valve member about a sealing perimeter. A separate annular member is loosely mounted in each seat recess adjacent the valve body and spaced from the associated seat assembly to form an annular back seal chamber between the associated seat assembly and the annular member exposed to both flowline and body fluid pressures. An annular O-ring is mounted in the back seal chamber between the separate annular member and the associated seating assembly and is movable between innermost and outermost sealing positions within the back seal chamber to form a seal between the valve body and the seat assembly when in such positions.

The outermost position of the back seal is radially outwardly of the perimeter of sealing contact of the associated face seal and the innermost position of the back seal is radially inwardly of the perimeter of sealing contact of the face seal thereby to provide a greater back area exposed to upstream fluid pressure than the front area when the back seal is in its outermost position. When body fluid pressure is greater than flowline fluid pressure, the back seal moves to its innermost radial position and a greater back area is exposed to body fluid pressure than the front area thereby to pressure actuate the seat assemblies toward the valve member.

One of the important features of the present design is in having the upstream seal assembly responsive to body fluid pressure so that upon an increase in body fluid pressure greater than the upstream pressure with the back face seal in the outermost position, the increased body pressure will "crack" the back face seal from its sealing contact and permit leakage of fluid behind the separate annular member thereby to relieve the body fluid pressure which may prevent an excessive body pressure from being reached due to very high body temperature. Such an arrangement eliminates the necessity for a separate body relief valve.

The invention accordingly comprises the constructions hereinafter described, the scope of the invention being indicated in the following claims.

In the accompanying drawings, in which two of various possible embodiments of the invention are illustrated, FIG. 1 is a longitudinal section illustrating a spherical plug valve constructed in accordance with the present invention;

FIG. 2 is an enlarged fragment of FIG. 1 illustrating the upstream seat assembly in its position when responsive to upstream fluid pressure;

FIG. 3 is an enlarged fragment illustrating the downstream seating assembly in the position when responsive to body fluid pressure;

FIG. 4 is an enlarged fragment of the upstream seating assembly similar to FIG. 2 but showing the upstream seat assembly responsive to an increased body fluid pressure to relieve the body fluid pressure; and FIG. 5 is an enlarged fragment of an upstream seat assembly employed with a gate valve member.

Referring now to the drawings for a better understanding of this invention, a valve which may be an end entrance spherical plug valve is illustrated at 10 in FIG. 1 and has a valve body portion 12 thereof defining a valve chamber 14. Valve body portion 12 has an inlet flow passage 15 in fluid communication with valve chamber 14. Body 12 has a flange 16 which may be suitably bolted to a pipeline or other conduit structure.

An end closure portion 18 is retained in sealing assembly with body portion 12 by a series of bolts or threaded studs 20. A flange 22 may be bolted to a pipeline or other conduit structure. Outlet flow passage 23 is aligned with inlet flow passage 15 and communicates with valve chamber 14. A valve member 24 has upper and lower trunnions 26 and 28 keyed thereto and has a fluid passageway 30 in alignment with inlet flow passage 15 and outlet flow passage 22. A cover plate 32 for lower trunnion 28 is bolted at 34 to valve body 12. An operator adapter plate 36 is secured to the upper portion of valve body 12 and an upper trunnion or stem 38 extends through a suitable opening in adapter plate 36. Upper stem 38 is integral with lower trunnion 26 and may be rotated for moving valve member 24 between open and closed positions. Any of a number of commercially available power or manual actuated valve operator devices may be fixed to adapter plate 36 in any desirable manner to provide mechanical means for rotating stem 38.

To establish a seal between rotatable spherical plug member 24 and valve body 12, an upstream annular seat assembly generally indicated 40 and a downstream annular seat assembly generally indicated 42 are retained within annular seat pockets generally indicated 44 and 46 formed about flow passages 15 and 22 as illustrated specifically in FIGS. 2–4. Seat assemblies 40 and 42 are generally identical but face in opposite directions with respect to each other. Seat pockets or recesses 44 and 46 comprise outer cylindrical surfaces 50 and 50A, intermediate cylindrical surfaces 52 and 52A separated by inner shoulders or ledges 54 and 54A. Inner cylindrical surfaces 56 and 56A are separated from intermediate cylindrical surfaces 52 and 52A by intermediate shoulders 58 and 58A. Outer shoulders 60 and 60A are positioned immediately adjacent inlet flow way 15 and outlet flow way 23.

Upstream seat assembly 40 and downstream seating assembly 42 each has surfaces thereon complementary to seat pockets 44 and 46 in which seat assemblies 40 and 42 are mounted. Seating assemblies 40 and 42 include respective outer circumferential surfaces 62, 62A, and intermediate cylindrical surfaces 64, 64A spaced from each other by outer shoulders 66 and 66A. Inner circumferential or cylindrical surfaces 68, 68A of respective seating assemblies 40, 42 are spaced from intermediate cylindrical surfaces 64, 64A by inclined shoulders 70 and 70A. Inner back shoulders 72 and 72A of seating assemblies 40 and 42 are provided with a plurality of radially spaced recesses 74, 74A therein in which coil spring members 76 and 76A are mounted to continuously urge seat members 40 and 42 toward engagement with spherical plug member 24.

Front or sealing faces 78, 78A of respective seating assemblies 40 and 42 have face seals 80 and 80A mounted in recesses provided within faces 78 and 78A. Face seals 80, 80A may be formed from a suitable material, such as Teflon, and are adapted to engage the working face of the adjacent spherical plug member 24 about a sealing perimeter indicated at P1.

A separate annular member indicated at 82, 82A is of a triangular cross section and is positioned within recesses 44, 46 adjacent inclined shoulders 70, 70A and are spaced from inclined shoulders 70, 70A to form back seal chambers 84, 84A therewith. Back seal chambers 84, 84A each has a width extending along inclined shoulders 70, 70A between cylindrical intermediate surfaces 52, 52A and annular shoulders 58, 58A. O-rings 86, 86A are mounted within back seal chambers 84, 84A for movement between outermost positions in sealing engagement with intermediate cylindrical surfaces 52 and innermost positions in engagement with respective intermediate shoulders 58, 58A.

Referring to FIG. 2 in which upstream seating assembly 40 is shown in a position whereby upstream fluid pressure is greater than body fluid pressure, back seal 86 is in its outermost position in sealing contact between seating assembly 40 and intermediate cylindrical surface 52 and the rear area exposed to upstream fluid pressure is defined by area P2 which area is greater than the area defined by perimeter P1 of the face seal 80, and results in a pressure differential urging upstream seating assembly 40 toward engagement with spherical plug member 24.

Downstream seating assembly 42 shown in FIG. 3 has a valve body fluid pressure greater than the adjacent flowline or downstream fluid pressure and back seal member 86A is in sealing engagement with valve body shoulder 58A and cylindrical surface 68A of downstream seating assembly 42. The area acted upon by body fluid pressure is indicated by area P3 at the rear of downstream seating assembly 42, and the area acted upon by body fluid pressure at the front portion of seat 42 is indicated by the area P4. Thus, an area differential defined by the difference between area P3 and P4 results in a force differential which is greater at the rear of downstream seating assembly 42 than at the face portion thereof thereby to cause seating assembly 42 to be pressure actuated toward valve member 24 to maintain sealing engagement therewith.

Referring to FIG. 4, in the event body fluid pressure increases to an amount greater than the upstream fluid pressure such as might be due from excessive heat in the valve body or the like, back seal member 86 will be forced by such increased fluid pressure in the valve body out of sealing engagement between upstream seating assembly 40 and the adjacent intermediate cylindrical surface 52. Separate annular member 82 is loosely mounted within the seat recess and does not maintain a tight sealing fit with the adjacent body surfaces defining seat recess 44 due to surface irregularities and the like. Therefore, fluid pressure from the valve body leaks behind annular seal member 82 once the sealing contact is broken with intermediate cylindrical surface 52 thereby to relieve the body fluid pressure. Such leakage will be maintained behind separate annular member 82 until back seal 86 is resealed against surface 52 or reaches its innermost position as shown in broken lines in FIG. 2 in sealing contact between seat assembly 40 and valve body 12. Even though upstream seating assembly 40 may permit release of body pressure due to an increased body fluid pressure, downstream seating assembly 42 will be maintained in sealing relation with valve ball member 24 as downstream seating assembly 42 is pressure actuated by the area differential toward sealing engagement with spherical plug member 24.

It is evident from the foregoing that an arrangement has been provided in which a single back seal is positioned to provide a total force differential greater at the back face of the seating assembly than at the front face thereof when either upstream fluid pressure or body fluid pressure is greater. Also, a relief feature is maintained or provided by having the separate annular member loosely fitted within the seat recess behind the seating assembly and permitting leakage therearound upon a breaking of the seal between the valve body and the upstream seating assembly upon body fluid pressure increasing to an amount greater than upstream fluid pressure.

Referring now to FIG. 5, another embodiment of the invention is shown in which the present invention is employed with a gate valve. A gate valve member is indicated at 90 and is mounted within a gate valve body 92 for reciprocal movement between open and closed positions as is well known in the art. Upstream sealing member 94 is provided adjacent gate member 90 and has a face seal 96 maintaining sealing engagement with the adjacent face of gate valve member 90. Upstream sealing member 94 is identical to upstream seating assembly 40 shown in FIG. 3. While not shown, it is understood that a separate downstream seating assembly is provided adjacent the other side of gate valve member 90 and acts in the same manner as downstream seating assembly 42. Upon an increase in fluid pressure within the gate valve body upstream sealing member 94 will act to relieve the increased body pressure in the same manner as upstream seating assembly 40.

What is claimed is:

1. A valve comprising a valve body having a valve chamber, upstream and downstream flow passages formed in said valve body and being in fluid communication with said valve chamber, a valve member disposed within the valve chamber and being movable between open and closed positions to control the flow of fluid through the valve, a seat recess formed in the valve body on the upstream side of the valve member, upstream and downstream seat assemblies movably disposed within said seat recesses, said upstream seat assembly having a circumferential face seal in sealing contact with the valve member about a sealing perimeter, a separate annular member loosely mounted in the upstream seat recess adjacent the valve body and spaced from said associated upstream seat assembly to form an annular back seal chamber between the seat assembly and the annular member, an annular seal in said back seal chamber between the annular member and the associated seating assembly, and movable within the back seal chamber between innermost and outermost positions in sealing contact with the valve body, said annular seal being out of contact with the valve body when moving between said innermost positions and said loosely mounted separate annular member permitting a leakage of fluid between the annular member and the valve body when said annular seal is between said innermost and outermost positions of the back seal chamber so that upon an increase in body pressure to an extent greater than the upstream fluid pressure the annular seal is moved out of contact with the valve body and a leakage of fluid is effected from the valve body behind the separate annular member to relieve the body fluid pressure.

2. A valve as set forth in claim 1 wherein said separate annular member is generally triangular in cross section and has a face thereof adjacent the associated seat assembly defining the back seal chamber and inclined with respect to the longitudinal axis of the flow passages through the valve.

3. A valve as set forth in claim 1 wherein said annular seal is an O-ring.

4. A valve as set forth in claim 1 wherein resilient spring means continuously urges each seat assembly toward the valve member.

5. A valve as set forth in claim 1 wherein said back seal chamber has a width extending in a generally transversely direction with respect to the longitudinal axis of the valve.

6. A valve comprising a valve body having a valve chamber, upstream and downstream flow passages formed in said valve body and being in fluid communication with said valve chamber, a valve member disposed within the valve chamber and being movable between open and closed positions to control the flow of fluid through the valve, seat recesses formed in the valve body on opposite sides of the valve member, a pair of seat assemblies having a circumferential face seal in sealing contact with the valve member about a sealing perimeter, a separate annular member loosely mounted in each seat recess and spaced rearwardly from the associated seat assembly to form an annular back seal chamber between the associated seat assembly and the separate annular member in generally longitudinal alignment with the face seal, each back seal chamber having a width extending in a generally transversely direction with respect to the longitudinal axis of the valve, an annular seal in each back seal chamber between the annular member and the associated seating assembly, each back seal chamber exposed to both flowline and body fluid pressures, the outer extent of each back seal chamber extending radially outwardly of the perimeter of sealing contact of the associated face seal and the inner extent of said back seal chamber extending radially inwardly of the perimeter of sealing contact of said associated face seal with each annular seal providing a fluid tight seal between said annular member and the associated seating assembly, each annular seal being positioned in the outer extent of the associated back seal chamber in sealing contact with the valve body when the adjacent flowline fluid pressure is greater than the body fluid pressure and being positioned in the inner extent of the associated back seal chamber in sealing contact with the valve body when the body fluid pressure is greater than the adjacent flowline fluid pressure, each annular seal being out of contact with the valve body when moving between said inner and outer extents of said back seal chamber, each loosely mounted separate annular member permitting a leakage of fluid between the annular member and valve body when the annular seal is between the inner and outer extents of the associated back seal chamber so that upon an increase in body pressure to an extent greater than the adjacent flowline fluid pressure the associated annular seal is moved out of contact with the valve body and a leakage of fluid is effected from the valve body behind the associated annular member to relieve the body fluid pressure.

7. A valve as set forth in claim 6 wherein said valve member is a gate valve member.

8. A valve as set forth in claim 6 wherein said valve member is a spherical plug valve member.

* * * * *